(No Model.)
J. H. POORBAUGH.
MORTAR MIXER.
No. 436,020. Patented Sept. 9, 1890.
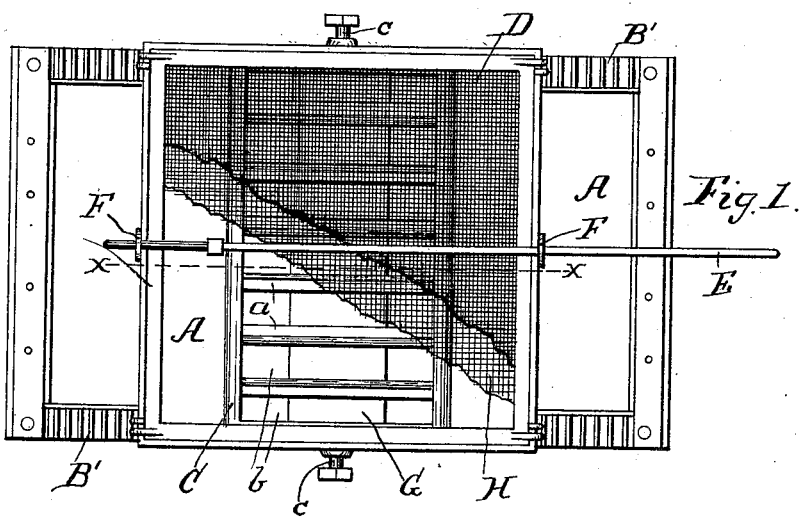
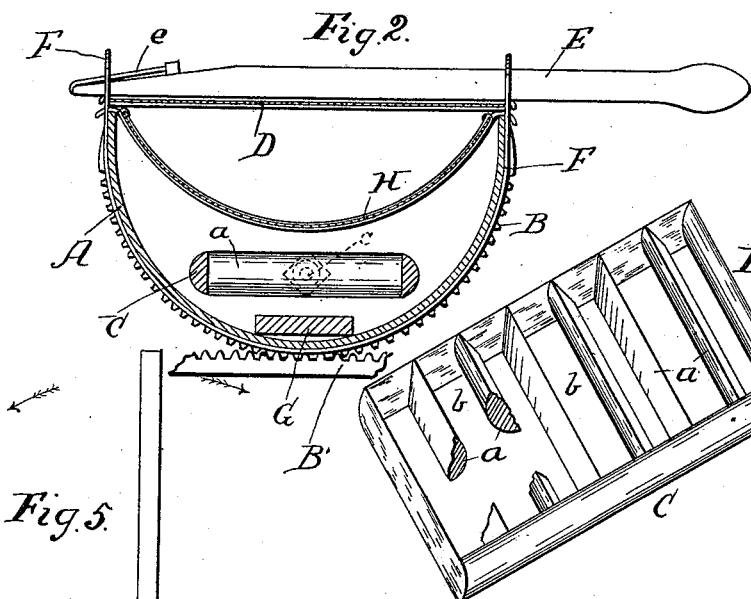
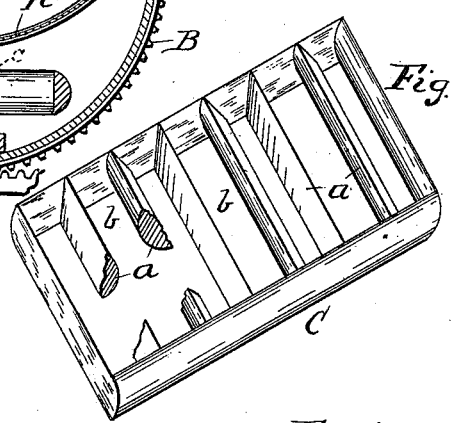
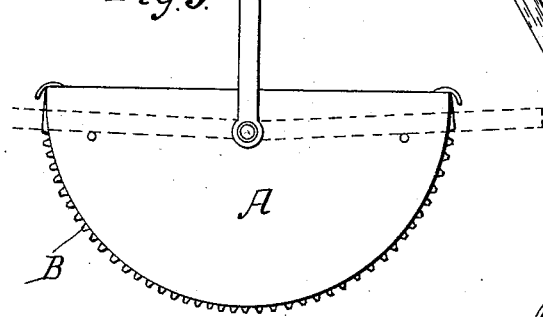
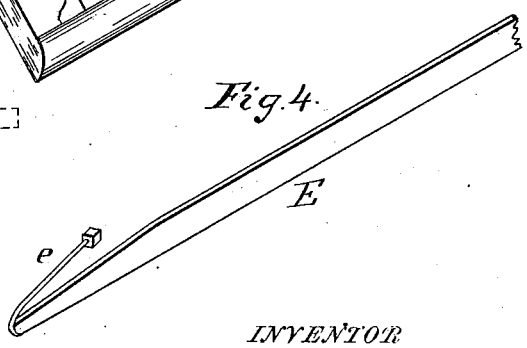
WITNESSES
C. H. Belt
D. H. Naylor
INVENTOR
James H. Poorbaugh
By J. P. & S. J. Wright
Attorneys

UNITED STATES PATENT OFFICE.

JAMES H. POORBAUGH, OF BURRTON, KANSAS.

MORTAR-MIXER.

SPECIFICATION forming part of Letters Patent No. 436,020, dated September 9, 1890.

Application filed December 14, 1889. Serial No. 333,716. (No model.)

*To all whom it may concern:*

Be it known that I, JAMES H. POORBAUGH, a citizen of the United States, residing at Burrton, in the county of Harvey and State of Kansas, have invented certain new and useful Improvements in Mortar-Mixers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to mixers, and particularly to the class of mortar-mixers, and it also may be used to great advantage for slaking lime.

The object of the invention is to provide a basin, box, or tank for mixing mortar or slaking lime with a mixer, and also to provide said basin with a rack and a lever and band together, which surrounds said basin, so as to keep the contents of the basin from splashing out, and at the same time have a rocking motion when in operation.

In the accompanying drawings, forming part of this specification, Figure 1 is a top view of my device with both screens broken away. Fig. 2 is a cross-section thereof, taken on line *x x*, Fig. 1. Figs. 3 and 4 are detached views. Fig. 5 is a modified form of my handle.

Like letters of reference denote like parts throughout the several figures.

A denotes the basin, which is made semicircular, and is provided near each end with rack-teeth B, which mesh into a toothed rack B′, attached to a floor-timber, secured together, as shown in the drawings.

The mixer C is cast or made all in one piece, with alternate ribs *a* and spaces *b*, and it is loosely pivoted inside the basin A near the bottom by set-screws *c* passing through each side of the said basin, so that any motion of the basin will cause the mixer C to oscillate on the pivot-screws *c*. It will be observed that the ribs *a* slant in opposite directions from each other for the purpose of more thoroughly mixing the material as it passes through the mixer, as clearly shown in Fig. 3. A screen D covers the entire top of the basin A, and its function is to prevent the contents of the basin from splashing out. The screen D is held in position by a handle or lever E, one end of which is provided with a spring *e*, and the other end forms a handle for the operator. The end of the lever E which is provided with the spring *e* passes through a slot in one end of a band F, which encircles the basin A and enters a similar slot in the other end of said band, thereby forming a secure lock for the band F, as well as affording a firm attachment for the lever E, as already shown in Fig. 4.

G is a block resting on the bottom of the basin to keep the contents of the latter from clogging.

In slaking lime the mixer C is removed, the lime put into the basin, then the water, and then the screen D is placed in position and held there by the band F and lever E. By rocking the basin by the lever the lime is slaked and is drained off through the screen D. When the device is to be used as a sand filter or screen, the mixer is removed, and in its stead is placed the block G, which is fastened by the set-screw *c*. The semicircular screen H is set in the basin A, and the sand thrown into it and sifted. The screen and mixer can be readily removed and the basin washed and made ready for some other use. It will be observed that by simply rocking the basin the mixer will rock back and forth on its pivots, and mortar can be mixed more thoroughly and in much less time than in the ordinary way.

I do not wish to be understood as limiting myself to the exact form of mixer herein described and shown, as I reserve to myself the right to use a pivoted mixer of any form located inside a rocking basin or box.

Having described my invention, what I claim as new, and desire to secure by Letters Patent, is—

1. In combination with a mortar-mixer, the semicircular basin provided on either side with pivots or set-screws, a mixer having alternate ribs and spaces slanting in opposite direction from each other, and each rib having one side curved and the other side straight, said mixer being loosely pivoted on the pivots or set-screws *c*, so that when the basin is rocked the mixer will oscillate, substantially as shown and described.

2. The semicircular basin A, provided with rack-teeth, and the toothed rack B', in combination with a pivoted mixer, substantially as shown, and for the purpose set forth.

3. The combination of the semicircular basin A, provided with rack-teeth, the toothed rack B', and the screen D with the pivoted mixer and set-screws c', substantially as shown and described, and for the purpose set forth.

4. The semicircular basin A and the block G, in combination with the semicircular screen H, adapted to fit inside the said basin, substantially as shown and described, and for the purpose set forth.

5. In a mixing apparatus, the semicircular basin provided with rack-teeth, the straight screen, the semicircular screen, and a mixer, substantially as shown and described, located beneath said screens and pivoted in the bottom of said basin, for the purpose set forth.

6. The combination of the semicircular basin A, the mixer C, and the screen D with the semicircular band F and the lever E, provided with the spring e, substantially as shown and described, and for the purpose set forth.

In testimony whereof I affix my signature in presence of two witnesses.

JAMES H. POORBAUGH.

Witnesses:
J. A. WELCH,
JOHN W. SHINE.